US010362243B2

(12) United States Patent
Kobayashi (10) Patent No.: US 10,362,243 B2
(45) Date of Patent: Jul. 23, 2019

(54) INFRARED IMAGING DEVICE, DIAPHRAGM CONTROL METHOD, AND DIAPHRAGM CONTROL PROGRAM (71) Applicant: FUJIFILM Corporation, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 185 days.

(21) Appl. No.: 15/472,809

(22) Filed: Mar. 29, 2017

(65) Prior Publication Data

US 2017/0208261 A1 Jul. 20, 2017

Related U.S. Application Data (63) Continuation of application No. PCT/JP2015/063798, filed on May 13, 2015.

(30) Foreign Application Priority Data

Sep. 30, 2014 (JP) ................. 2014-200075

(51) Int. Cl.
*H04N 5/33* (2006.01)
*G01J 1/02* (2006.01)
(Continued)

(52) U.S. Cl.
CPC ................. *H04N 5/33* (2013.01); *G01J 1/02* (2013.01); *G01J 5/026* (2013.01); *G01J 5/084* (2013.01);
(Continued)

(58) Field of Classification Search
None
See application file for complete search history.

(56) References Cited

U.S. PATENT DOCUMENTS 5,994,701 A 11/1999 Tsuchimoto et al.
2013/0083200 A1 4/2013 Saito et al.

FOREIGN PATENT DOCUMENTS

JP 61-77724 A 4/1986
JP 4-99925 A 3/1992
(Continued)

OTHER PUBLICATIONS

English translation of the Written Opinion of the International Searching Authority (Form PCT/ISA/237) dated Aug. 4, 2015, for International Application No. PCT/JP2015/063798.
(Continued)

Primary Examiner — James M Anderson, II
(74) Attorney, Agent, or Firm — Birch, Stewart, Kolasch & Birch, LLP (57) ABSTRACT An infrared imaging device includes an imaging element including a plurality of infrared detection pixels, a diaphragm, a temperature detection unit that detects the temperature of the diaphragm, a main memory that stores a first signal value corresponding to infrared rays, which are radiated from the diaphragm and are incident on each of the infrared detection pixels of the imaging element, so as to be associated with the F-number and temperature of the diaphragm, and a system control unit that controls the F-number of the diaphragm, based on the first signal value, captured image data obtained by capturing an image of the object using the imaging element in a state in which the F-number of the diaphragm is set to an arbitrary value, the temperature of the diaphragm detected by the temperature detection unit and the arbitrary value.

21 Claims, 4 Drawing Sheets (51) Int. Cl.
    *G01J 5/48*     (2006.01)
    *G03B 7/095*     (2006.01)
    *H04N 5/232*     (2006.01)
    *G01J 5/02*     (2006.01)
    *G01J 5/08*     (2006.01)
    *G01J 5/10*     (2006.01)
    *H04N 5/365*     (2011.01)
    *H04N 5/378*     (2011.01)
    *G03B 17/55*     (2006.01)
    *H04N 5/238*     (2006.01)
    *G01J 5/00*     (2006.01)
    *G01J 5/06*     (2006.01)

(52) U.S. Cl.
    CPC ........... *G01J 5/0831* (2013.01); *G01J 5/0834* (2013.01); *G01J 5/10* (2013.01); *G01J 5/48* (2013.01); *G03B 7/095* (2013.01); *G03B 17/55* (2013.01); *H04N 5/232* (2013.01); *H04N 5/238* (2013.01); *H04N 5/365* (2013.01); *H04N 5/3653* (2013.01); *H04N 5/378* (2013.01); *G01J 2005/0048* (2013.01); *G01J 2005/0077* (2013.01); *G01J 2005/068* (2013.01); *G01J 2005/106* (2013.01)

(56) References Cited

FOREIGN PATENT DOCUMENTS

| | | |
|---|---|---|
| JP | 9-101207 A | 4/1997 |
| JP | 10-115557 A | 5/1998 |
| JP | 2008-278036 A | 11/2008 |
| JP | 2013-80130 A | 5/2013 |

OTHER PUBLICATIONS

International Search Report for PCT/JP2015/063798 (PCT/ISA/210) dated Aug. 4, 2015.
Written Opinion of the International Searching Authority for PCT/JP2015/063798 (PCT/ISA/237) dated Aug. 4, 2015.

INFRARED IMAGING DEVICE, DIAPHRAGM CONTROL METHOD, AND DIAPHRAGM CONTROL PROGRAM

CROSS REFERENCE TO RELATED APPLICATION

This is a continuation of International Application No. PCT/JP2015/063798 filed on May 13, 2015, and claims priority from Japanese Patent Application No. 2014-200075 filed on Sep. 30, 2014, the entire disclosures of which are incorporated herein by reference.

BACKGROUND OF THE INVENTION

1. Field of the Invention

The present invention relates to an infrared imaging device, a diaphragm control method, and a computer readable medium storing a diaphragm control program.

2. Description of the Related Art

An infrared imaging device, such as a thermographic device or a night vision device, which captures infrared images has been known (for example, see JP2013-080130A, JP2008-278036A, and JP1997-101207A (JP-H09-101207A)).

JP2013-080130A discloses an infrared imaging device in which an imaging optical system includes a diaphragm.

JP2008-278036A discloses an infrared imaging device which minimizes the opening area of a diaphragm included in an imaging optical system to prevent the damage of an imaging element in a case in which an image of a high-temperature object is captured.

JP1997-101207A (JP-H09-101207A) discloses an infrared imaging device which, in a case in which the highest temperature among the temperatures of an object measured in a temperature measurement range which is being set is higher than the upper limit of the temperature measurement range which is being set, changes the temperature measurement range to a range including the highest temperature.

SUMMARY OF THE INVENTION

In an infrared imaging device including a diaphragm, infrared rays which are radiated from a diaphragm blade are incident on an imaging element. Therefore, captured image data output from the imaging element includes data corresponding to the infrared rays radiated from the diaphragm blade.

It is effective to reduce the opening area of the diaphragm in order to prevent the output from each of the infrared detection pixels of the imaging element from being saturated for a high-temperature object. However, when the opening area of the diaphragm is reduced, the amount of infrared rays which are radiated from the diaphragm blade and are then incident on the imaging element increases. Therefore, it is not simple to control the opening area of the diaphragm.

A method which monitors an output signal value from each infrared detection pixel of an imaging element while changing a diaphragm to a plurality of values is considered. However, in this method, it takes a lot of time and power to switch the diaphragm to a plurality of values.

The devices disclosed in JP2013-080130A, JP2008-278036A, and JP1997-101207A (JP-H09-101207A) do not control the diaphragm, considering the infrared rays radiated from the diaphragm blade.

The invention has been made in view of the above-mentioned problems and an object of the invention is to provide an infrared imaging device, a diaphragm control method, and a computer readable medium storing a diaphragm control program which can determine an optimum F-number in a short time and with lower power consumption, considering infrared rays radiated from a diaphragm blade.

An infrared imaging device according to the invention comprises an imaging element including a plurality of infrared detection pixels which are two-dimensionally arranged, a diaphragm that is provided closer to an object than the imaging element, a temperature detection unit that detects a temperature of the diaphragm, a storage unit that stores a first signal value corresponding to infrared rays, which are radiated from the diaphragm and are incident on each of the infrared detection pixels of the imaging element, so as to be associated with an F-number and the temperature of the diaphragm, and a diaphragm control unit that selects one of settable F-numbers, on the basis of the first signal value, captured image data obtained by capturing an image of the object using the imaging element in a state in which the F-number of the diaphragm is set to an arbitrary value, the temperature of the diaphragm detected by the temperature detection unit and the arbitrary value, and controls the diaphragm so as to be set to the selected F-number.

A diaphragm control method according to the invention is performed by an infrared imaging device including an imaging element including a plurality of infrared detection pixels which are two-dimensionally arranged, a diaphragm that is provided closer to an object than the imaging element, a temperature detection unit that detects a temperature of the diaphragm, and a storage unit that stores a first signal value corresponding to infrared rays, which are radiated from the diaphragm and are incident on each of the infrared detection pixels of the imaging element, so as to be associated with an F-number and the temperature of the diaphragm. The diaphragm control method comprises a diaphragm control step of selecting one of settable F-numbers, on the basis of the first signal value, captured image data obtained by capturing an image of the object using the imaging element in a state in which the F-number of the diaphragm is set to an arbitrary value, the temperature of the diaphragm detected by the temperature detection unit and the arbitrary value, and controlling the diaphragm so as to be set to the selected F-number.

A diaphragm control program stored in a computer readable medium according to the invention causes an infrared imaging device including an imaging element including a plurality of infrared detection pixels which are two-dimensionally arranged, a diaphragm that is provided closer to an object than the imaging element, a temperature detection unit that detects a temperature of the diaphragm, and a storage unit that stores a first signal value corresponding to infrared rays, which are radiated from the diaphragm and are incident on each of the infrared detection pixels of the imaging element, so as to be associated with an F-number and the temperature of the diaphragm to perform a diaphragm control step of selecting one of settable F-numbers, on the basis of the first signal value, captured image data obtained by capturing an image of the object using the imaging element in a state in which the F-number of the diaphragm is set to an arbitrary value, the temperature of the diaphragm detected by the temperature detection unit and the arbitrary value, and controlling the diaphragm so as to be set to the selected F-number.

According to the invention, it is possible to provide an infrared imaging device, a diaphragm control method, and a computer readable medium storing a diaphragm control program which can determine an optimum F-number in a short time and with lower power consumption, considering infrared rays radiated from a diaphragm blade.

DESCRIPTION OF THE PREFERRED EMBODIMENTS

Hereinafter, an embodiment of the invention will be described with reference to the drawings.

Figure 1:
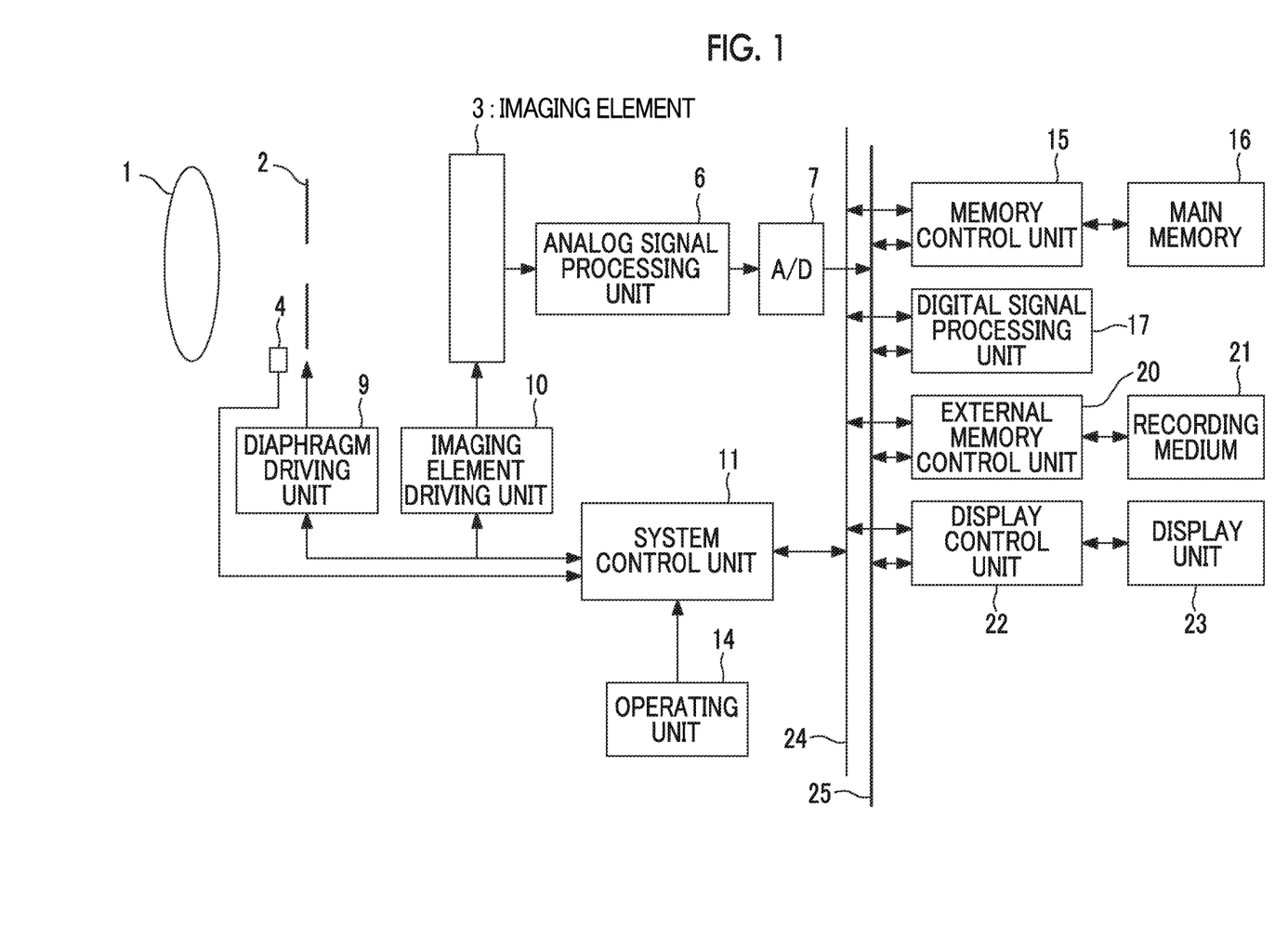
FIG. 1 is a diagram schematically illustrating the structure of an infrared imaging device for describing an embodiment of the invention.

FIG. 1 is a diagram schematically illustrating the structure of an infrared imaging device for describing an embodiment of the invention.

The infrared imaging device illustrated in FIG. 1 comprises an imaging lens 1, a diaphragm 2, an imaging element 3 that captures an image of an object through the imaging lens 1 and the diaphragm 2, a temperature detection unit 4 that detects the temperature of the diaphragm 2, an analog signal processing unit 6, an analog/digital conversion circuit (A/D conversion circuit) 7, a diaphragm driving unit 9, and an imaging element driving unit 10.

The imaging element 3 includes a plurality of infrared detection pixels which are two-dimensionally arranged and detect infrared rays (in general, light with a wavelength of 8 μm to 12 μm) that have been radiated from the object and focused through the imaging lens 1 and the diaphragm 2. The imaging element 3 is driven by the imaging element driving unit 10.

A pyroelectric element is given as an example of an infrared detection element used in the infrared detection pixel. Alternatively, a thermopile-type infrared detection element in which thermocouples generating the Seebeck effect are connected or a bolometer-type infrared detection element using a change in a resistance value caused by a temperature rise may be used.

The infrared detection element is not limited to the above and any type of infrared detection element may be used as long as it can detect infrared rays. In the specification, a set of pixel signals output from all of the infrared detection pixels of the imaging element 3 is referred to as captured image data.

The diaphragm 2 is provided closer to the object than the imaging element 3 and the opening area of the diaphragm 2 is controlled by the diaphragm driving unit 9.

The temperature detection unit 4 is a temperature sensor, such as a thermistor, is provided in the vicinity of the diaphragm 2, and notifies a system control unit 11 of the detected temperature.

The analog signal processing unit 6 performs the analog signal processing including an amplification process of multiplying each pixel signal value of the captured image data output from the imaging element 3 by the gain to amplify the captured image data.

The A/D conversion circuit 7 converts analog captured image data output from the analog signal processing unit 6 into digital data.

The analog signal processing unit 6, the A/D conversion circuit 7, the diaphragm driving unit 9, and the imaging element driving unit 10 are controlled by the system control unit 11. The system control unit 11 functions as a diaphragm control unit.

A command signal is input from the user to the system control unit 11 through an operating unit 14.

In addition, the electric control system of the infrared imaging device comprises a main memory 16 that functions as a storage unit, a memory control unit 15 connected to the main memory 16, a digital signal processing unit 17 that performs, for example, a process of correcting the fixed pattern noise (FPN) of the captured image data output from the A/D conversion circuit 7 or a process of converting the corrected captured image data into a format which can be displayed by a display unit 23, an external memory control unit 20 to which a detachable recording medium 21 is connected, and a display control unit 22 to which the display unit 23 is connected.

The memory control unit 15, the digital signal processing unit 17, the external memory control unit 20, and the display control unit 22 are connected to each other by a control bus 24 and a data bus 25 and are controlled by instructions from the system control unit 11.

Figure 2:
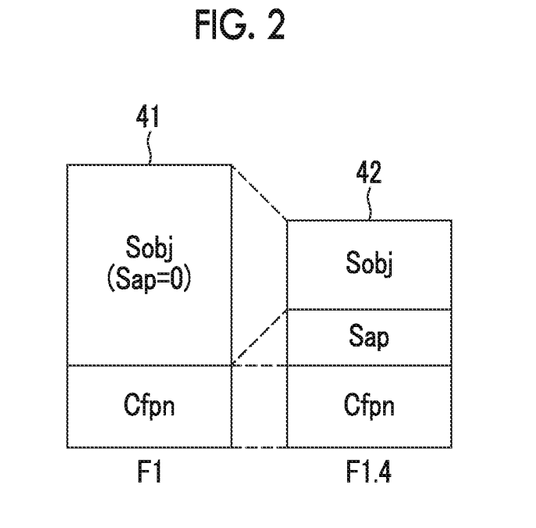
FIG. 2 is a diagram illustrating pixel signal values output from an infrared detection pixel of an imaging element 3 in a state in which the F-number=F1 and the F-number=F1.4 are established.

FIG. 2 is a diagram illustrating pixel signal values output from the infrared detection pixels of the imaging element 3 in a state in which the F-number=F1 and the F-number=F1.4 are established. In FIG. 2, reference numeral 41 indicates a pixel signal value output from an infrared detection pixel at an arbitrary coordinate position of the imaging element 3 in a state in which the F-number=F1 is established. Reference numeral 42 indicates a pixel signal value output from the infrared detection pixel at the arbitrary coordinate position of the imaging element 3 in a state in which the F-number=F1.4 is established.

Each of the pixel signal value 41 and the pixel signal value 42 includes a signal component Sobj corresponding to infrared rays radiated from the object, a diaphragm radiation component Sap corresponding to infrared rays radiated from the diaphragm 2, and a fixed pattern noise component Cfpn.

Figure 3:
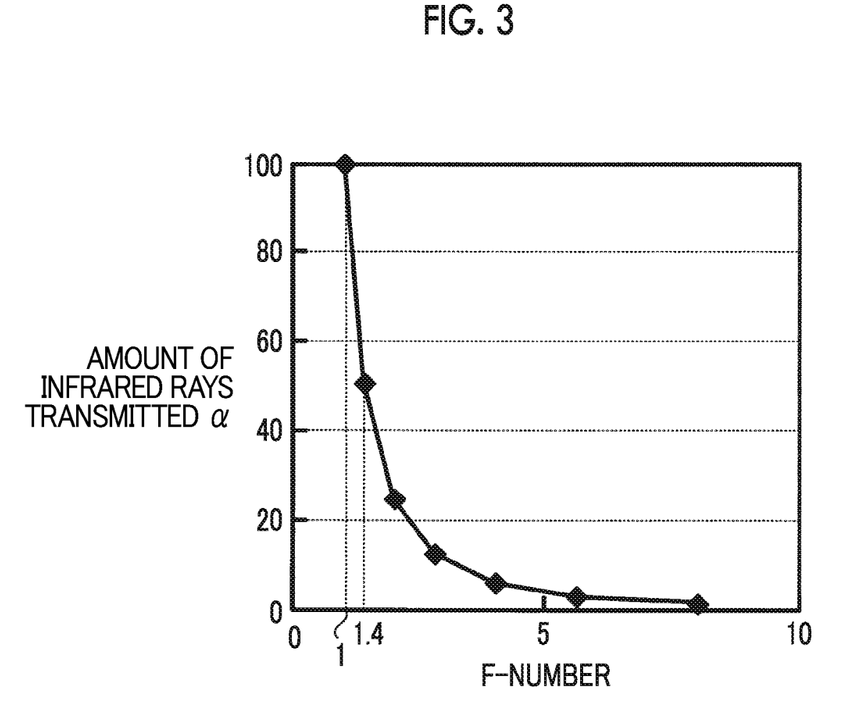
FIG. 3 is a diagram illustrating the relationship between the F-number of a diaphragm 2 and infrared transmittance a indicating the amount of infrared rays transmitted through the diaphragm 2.

FIG. 3 is a diagram illustrating the relationship between the F-number of the diaphragm 2 and infrared transmittance α indicating the amount of infrared rays transmitted through the diaphragm 2. In FIG. 3, the infrared transmittance α through the diaphragm 2 when the F-number=F1 is established (a state in which the opening area of the diaphragm 2 is the maximum) is standardized to "100%".

As illustrated in FIG. 3, when the F-number=F1.4 is established, the amount of infrared rays incident on the imaging element 3 is half of the amount of infrared rays incident on the imaging element 3 when the F-number=F1 is established. Therefore, the signal component Sobj of the pixel signal value 42 illustrated in FIG. 2 is about half of the signal component Sobj of the pixel signal value 41.

Figure 4A:
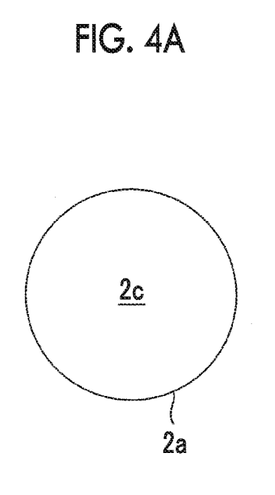
FIGS. 4A, 4B, and 4C are diagrams illustrating the diaphragm 2 as viewed from an imaging element 3.
Figure 4B:
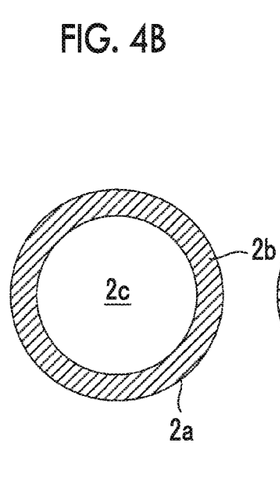
Figure 4C:
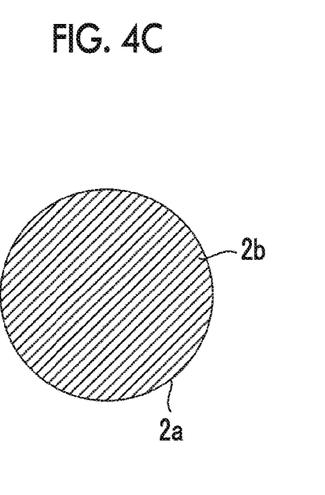

FIGS. 4A, 4B, and 4C are diagrams illustrating the diaphragm 2 as viewed from the imaging element 3. FIG. 4A illustrates a state in which the diaphragm 2 is fully opened (F-number=F1), FIG. 4B illustrates the state of the diaphragm 2 when the F-number=F1.4 is established, and FIG. 4C illustrates a state in which the diaphragm 2 is fully closed (F-number=F∞). In FIGS. 4A, 4B, and 4C, reference numeral 2a indicates the outer circumference of a diaphragm blade, reference numeral 2b indicates the surface of the diaphragm blade, and reference numeral 2c indicates the opening of the diaphragm 2.

As illustrated in FIGS. 4A, 4B, and 4C in which the diaphragm 2 is viewed from the imaging element 3, when the F-number of the diaphragm 2 varies, the exposure area of the diaphragm blade varies. For example, the comparison between the F-number=F∞ and the F-number=F1.4 shows that the exposure area of the diaphragm blade when the F-number=F1.4 is established is about half of the exposure area of the diaphragm blade when the F-number=F∞ is established. In the infrared imaging device illustrated in FIG. 1, infrared rays which are radiated from an exposed portion of the diaphragm blade are incident on the imaging element 3 and the diaphragm radiation component Sap illustrated in FIG. 2 is output from each of the infrared detection pixels. The exposure area of the diaphragm blade means the area of a portion of the diaphragm blade which is not shielded by an obstacle that blocks infrared rays, as viewed from the imaging element 3. When the F-number=F1 is established, the exposure area is "0".

Figure 5:
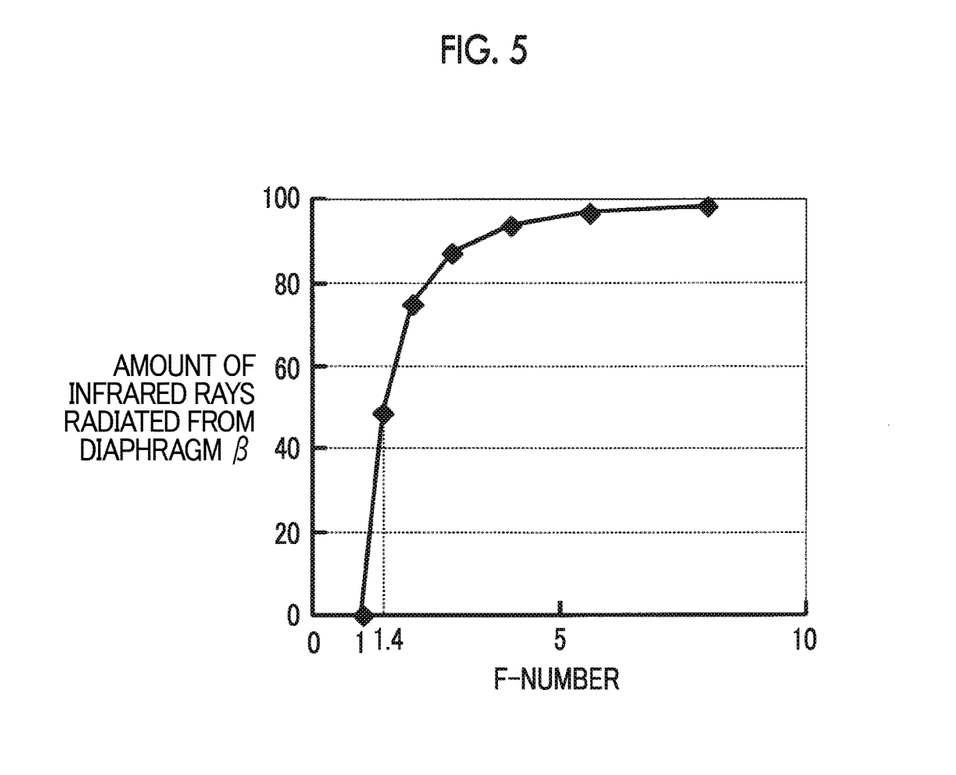
FIG. 5 is a diagram illustrating the relationship between the F-number and the amount of infrared rays radiated from the diaphragm 2.

FIG. 5 is a diagram illustrating the relationship between the F-number and the amount of infrared rays radiated from the diaphragm 2. In FIG. 5, the amount of infrared rays β which are radiated from the diaphragm 2 when the F-number=F1 is established is standardized to "0" and the amount of infrared rays which are radiated from the diaphragm 2 when the F-number=F∞ is established is standardized to "100".

As illustrated in FIG. 5, the amount of infrared rays β which are radiated from the diaphragm 2 when the F-number=F1.4 is established is about half of the amount of infrared rays which are radiated from the diaphragm 2 when the F-number=F∞ is established.

Data illustrated in FIG. 5 varies depending on the temperature of the diaphragm 2. The diaphragm radiation component Sap included in the pixel signal value is proportional to the product of the fourth power of the temperature of the diaphragm 2 and the exposure area of the diaphragm 2. Therefore, when the diaphragm radiation component Sap included in each pixel signal value of the captured image data obtained by capturing the image of the object in a state in which the F-number and temperature of the diaphragm 2 have arbitrary values is experimentally calculated in advance, it is possible to calculate the diaphragm radiation component Sap included in the pixel signal value obtained by capturing an image at the F-number and the temperature even in a case in which the F-number and temperature of the diaphragm 2 vary during imaging.

In the infrared imaging device illustrated in FIG. 1, in a manufacturing stage, an operator sets the F-number to a reference F-number (hereinafter, represented by Fa) and sets the temperature of the diaphragm 2 to a reference temperature Ta0. In this state, the imaging element 3 captures the image of the object with a known temperature to acquire captured image data.

The reference F-number Fa is set to the minimum value at which an output signal from each of the infrared detection pixels is not saturated. In addition, in a step different from the above-mentioned step, the operator calculates the fixed pattern noise component Cfpn output from each of the infrared detection pixels, using a known method.

The operator subtracts a signal value corresponding to the temperature of the captured object from each pixel signal value of the acquired captured image data and further subtracts the fixed pattern noise component Cfpn to calculate a diaphragm radiation component Sap (hereinafter, represented by Sap0) which is a first signal value. Then, the operator stores the calculated diaphragm radiation component Sap0 in the main memory 16 so as to be associated with the reference F-number Fa and the reference temperature Ta0.

Therefore, when the F-number is set to an arbitrary value and the temperature of the diaphragm 2 at that time is known, it is possible to calculate the diaphragm radiation component Sap included in each pixel signal value of the captured image data, which is obtained by capturing the image of the object using the imaging element 3, using data stored in the main memory 16.

The fixed pattern noise component Cfpn included in each pixel signal value of the captured image data can be calculated by a known method. For example, a shutter with a uniform temperature can be inserted into the optical axis of the imaging optical system and the system control unit 11 calculates the fixed pattern noise component Cfpn included in each pixel signal value on the basis of the captured image data which is obtained by capturing the image of the shutter using the imaging element 3.

When the diaphragm radiation component Sap and the fixed pattern noise component Cfpn can be calculated in each pixel signal value of the captured image data, it is possible to calculate the signal component Sobj from the relationship illustrated in FIG. 2.

As illustrated in FIG. 3, a variation in the signal component Sobj with a change in the F-number is known. Therefore, when the signal component Sobj included in each pixel signal value of the captured image data obtained in a state in which the diaphragm is set to the reference F-number Fa can be calculated, the signal component Sobj included in each pixel signal value of the captured image data obtained in a state in which the other F-numbers are set can be calculated.

When the signal component Sobj can be calculated for each settable F-number, it is possible to know the magnitude of each pixel signal value of the captured image data, which is obtained by capturing the image of the object in a state in which the diaphragm is set to each settable F-number, for each settable F-number.

In the infrared imaging device illustrated in FIG. 1, the system control unit 11 calculates each pixel signal value of the captured image data, which is obtained by capturing the image of the object in a state in which the diaphragm is set to each settable F-number, for each settable F-number. The system control unit 11 selects, as an optimum F-number, the minimum F-number among the F-numbers corresponding to the captured image data in which each calculated pixel signal value is less than a saturation level (threshold value) and controls the diaphragm 2 so as to be set to the optimum F-number. This control makes it possible to accurately capture an image without saturating a high-temperature object.

Next, the operation of the infrared imaging device when the diaphragm is controlled will be described with reference to a flowchart.

Figure 6:
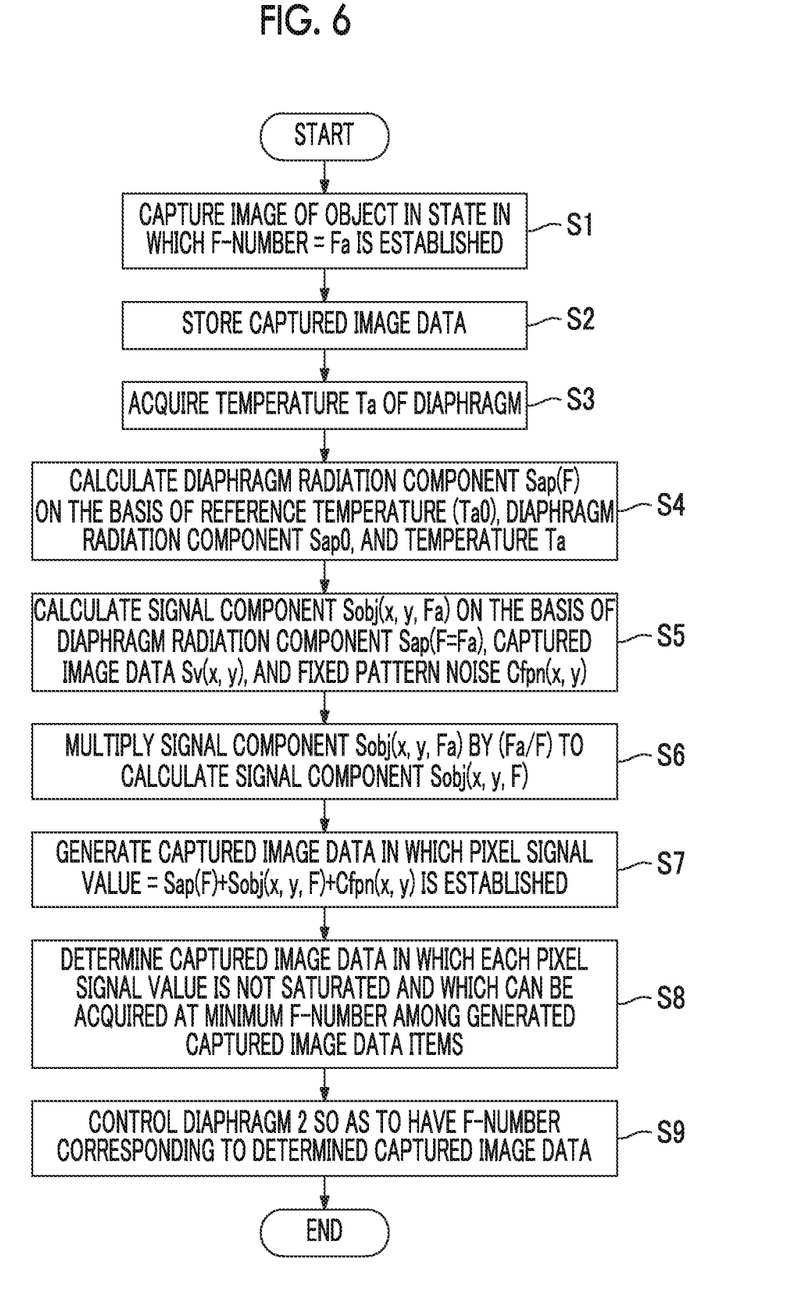
FIG. 6 is a flowchart illustrating the operation of the infrared imaging device illustrated in FIG. 1 when the diaphragm is controlled.

FIG. 6 is a flowchart illustrating the operation of the infrared imaging device illustrated in FIG. 1 when the diaphragm is controlled.

First, the system control unit 11 sets the F-number of the diaphragm 2 to an arbitrary value and directs the imaging element 3 to capture an image of an object in this state (Step S1). Here, it is assumed that the arbitrary value is the reference F-number Fa.

When the imaging process in Step S1 ends, captured image data is output from the imaging element 3, is subjected to analog signal processing, and is temporarily stored in the main memory 16 (Step S2). It is preferable that the arbitrary value is equal to or greater than the reference F-number Fa in order to prevent each pixel signal value of the captured image data from reaching the saturation level and to accurately determine the optimum F-number.

Then, the system control unit 11 acquires the temperature detected by the temperature detection unit 4 (Step S3). Here, it is assumed that the acquired temperature is a temperature Ta.

Then, the system control unit 11 acquires the reference F-number Fa, the reference temperature Ta0, and the diaphragm radiation component Sap0 associated with the reference F-number Fa and the reference temperature Ta0 from the main memory 16. The system control unit 11 calculates a diaphragm radiation component Sap(F), which is a second signal value included in each pixel signal value of the captured image data obtained by capturing an image using the imaging element 3 in a state in which the diaphragm is set to each F-number, on the basis of the acquired information, the temperature Ta acquired in Step S3, each F-number that can be set to the infrared imaging device, and the F-number (=F1) at which the amount of infrared rays β radiated from the diaphragm 2 is the minimum (the exposure area of the diaphragm blade is the minimum), using the following Expression (1) (Step S4).

$$Sap(F) = Sap0 \times \left(\frac{Ta}{Ta0}\right)^4 \times \frac{1-\left(\frac{F1}{F}\right)^2}{1-\left(\frac{F1}{Fa}\right)^2} \quad (1)$$

F indicates each F-number that can be set to the infrared imaging device.

(Ta/Ta0) forms a first ratio. $\{1-(F1/F)^2\}/\{1-(F1/Fa)^2\}$ corresponds to the ratio of the F-number=Fa to the F-number=F and forms a second ratio.

Then, the system control unit 11 calculates a signal component Sobj(x, y, Fa) included in a pixel signal value Sv(x, y), on the basis of the diaphragm radiation component Sap (F=Fa) which is the second signal value calculated by substituting F with Fa in Expression (1), the pixel signal value Sv(x, y) of the captured image data stored in Step S2, and a fixed pattern noise component Cfpn(x, y) (acquired from the main memory 16) included in the pixel signal value Sv(x, y), using the following Expression (2) (Step S5). Here, (x, y) indicates the coordinates of a pixel signal value.

$$Sobj(x,y,Fa)=Sv(x,y)-Sap(F=Fa)-Cfpn(x,y) \quad (2)$$

Then, the system control unit 11 calculates a signal component Sobj(x, y, F), which is a third signal value included in each pixel signal value of the captured image data obtained by capturing an image using the imaging element 3 in a state in which the diaphragm is set to each settable F-number, for each settable F-number, using the following Expression (3) (Step S6).

$$Sobj(x,y,F)=Sobj(x,y,Fa)\times(Fa/F)^2 \quad (3)$$

Here, (Fa/F) forms the second ratio.

The system control unit 11 adds the diaphragm radiation component Sap(F) calculated in Step S4, the signal component Sobj(x, y, F) calculated in Step S6, and the fixed pattern noise component Cfpn(x, y) used in Step S5 to obtain a pixel signal value V(x, y, F) (Step S7).

The pixel signal value V(x, y, F) corresponds to each pixel signal value of the captured image data obtained by capturing an image using the imaging element 3 in a state in which the diaphragm 2 is set to each settable F-number. In addition, the pixel signal value V(x, y, F=Fa) is equivalent to each pixel signal value of the captured image data stored in Step S2.

The system control unit 11 determines all of captured image data items in which a pixel signal value is less than a threshold value (saturation level) and which can be acquired at the minimum F-number among the captured image data items for each F-number obtained in Step S7. Then, the system control unit 11 selects the F-number corresponding to the determined captured image data as the optimum F-number (Step S8).

The system control unit 11 controls the diaphragm 2 so as to be set to the optimum F-number and ends the diaphragm control process (Step S9).

As described above, according to the infrared imaging device illustrated in FIG. 1, it is possible to determine the F-number at which imaging can be performed in a state in which all of the pixel signal values are not saturated, considering the diaphragm radiation component Sap corresponding to the infrared rays radiated from the diaphragm 2. It is possible to determine the optimum F-number using only one imaging operation (Step S1 in FIG. 6), without performing a plurality of imaging operations while changing the F-number. Therefore, it is possible to reduce the time and power required to determine the optimum F-number.

In the above description, in Step S8 of FIG. 6, among the generated captured image data items, captured image data items in which each pixel signal value is less than the threshold value and which can be acquired at the minimum F-number are determined. However, in Step S8, among the generated captured image data items, captured image data items in which a pixel signal value output from a designated infrared detection pixel is less than the threshold value and which can be acquired at the minimum F-number may be determined.

For example, it is assumed that an infrared detection pixel in which the image of an object portion with the highest temperature is formed is the designated infrared detection pixel. In this case, it is possible to select the F-number at which all of the captured image data is not saturated. A temperature distribution based on the captured image data stored in Step S2 can be analyzed to specify the infrared detection pixel in which the image of the object portion with the highest temperature is formed.

In addition, it is assumed that an infrared detection pixel in which the image of a main portion (for example, a moving object) of the object is formed is the designated infrared detection pixel. In this case, it is possible to select the F-number at which a main portion that the user wants to particularly check in an image is not saturated.

In the above description, only the diaphragm radiation component Sap0 associated with the reference F-number and the reference temperature is recorded as the first signal value in the main memory 16 in advance. As a modification example, table data which is obtained by measuring the diaphragm radiation component Sap for each settable F-number may be stored in the main memory 16 so as to be associated with each temperature of the diaphragm 2.

For example, a signal value corresponding to the temperature of the object which has a known temperature and has a uniform temperature distribution, and fixed pattern noise can be subtracted from each pixel signal value of the captured image data, which is obtained by capturing the image of the object using the imaging element 3, to calculate the diaphragm radiation component Sap corresponding to the infrared rays radiated from the diaphragm 2 for each of the infrared detection pixels.

This operation can be repeated while the F-number is changed to calculate the table data. In addition, the operation can be repeated at a fixed F-number while the temperature of the diaphragm 2 is changed to generate a plurality of table data items for the same F-number.

In this modification example, the system control unit 11 may calculate the diaphragm radiation component Sap(F) for each F-number, on the basis of table data corresponding to the temperature Ta, in Step S4 of FIG. 6.

According to this modification example, it is possible to reduce the amount of calculation in Step S4 illustrated in FIG. 6. Therefore, it is possible to increase the speed of the diaphragm control process and to reduce power consumption.

For example, the diaphragm control process described in FIG. 6 may be performed at the time when an image instruction is received from the user in a still image capture mode.

In a video imaging mode, the diaphragm control process may be performed one time when the capture of a motion picture starts. Then, in a case in which a variation in the highest temperature of the object based on captured image data output from the imaging element 3 is greater than a threshold value, the diaphragm control process may be performed. As such, in a case in which a variation in the highest temperature of the object is large, a variation in the signal component Sobj is large. Therefore, when the optimum F-number is selected again at this time, it is possible to continuously capture a high-quality motion picture.

A program that causes a computer to perform each step performed by the system control unit 11 according to this embodiment may be provided. The program is recorded in a non-transitory computer readable recording medium.

Examples of the "computer readable recording medium" include an optical medium, such as a compact disc-ROM (CD-ROM), and a magnetic recording medium, such as a memory card. In addition, the program may be provided by downloading through a network.

As described above, the specification discloses the following.

A disclosed infrared imaging device comprises an imaging element including a plurality of infrared detection pixels which are two-dimensionally arranged, a diaphragm that is provided closer to an object than the imaging element, a temperature detection unit that detects a temperature of the diaphragm, a storage unit that stores a first signal value corresponding to infrared rays, which are radiated from the diaphragm and are incident on each of the infrared detection pixels of the imaging element, so as to be associated with an F-number and the temperature of the diaphragm, and a diaphragm control unit that selects one of settable F-numbers, on the basis of the first signal value, captured image data obtained by capturing an image of the object using the imaging element in a state in which the F-number of the diaphragm is set to an arbitrary value, the temperature of the diaphragm detected by the temperature detection unit and the arbitrary value, and controls the diaphragm so as to be set to the selected F-number.

In the disclosed infrared imaging device, the storage unit stores the first signal value so as to be associated with a reference F-number and a reference temperature of the diaphragm. The diaphragm control unit calculates a second signal value corresponding to the infrared rays, which are radiated from the diaphragm and are incident on each of the infrared detection pixels, for each F-number, on the basis of a first ratio of the temperature of the diaphragm detected by the temperature detection unit to the reference temperature, a second ratio of the settable F-number to the reference F-number and the first signal value, calculates a third signal value corresponding to infrared rays, which are radiated from the object and are incident on each of the infrared detection pixels, for each F-number, on the basis of the captured image data, the second signal value calculated for the arbitrary value, fixed pattern noise of each of the infrared detection pixel and the second ratio, and selects a minimum value among the F-numbers at which the sum of the second and third signal values calculated for each of the infrared detection pixel and the fixed pattern noise of each of the infrared detection pixels is less than a threshold value.

In the disclosed infrared imaging device, the storage unit stores the first signal value so as to be associated with a reference F-number and a reference temperature of the diaphragm. The diaphragm control unit calculates a second signal value corresponding to the infrared rays, which are radiated from the diaphragm and are incident on each of the infrared detection pixels, for each F-number, on the basis of a first ratio of the temperature of the diaphragm detected by the temperature detection unit to the reference temperature, a second ratio of the settable F-number to the reference F-number and the first signal value, calculates a third signal value corresponding to infrared rays, which are radiated from the object and are incident on each of the infrared detection pixels, for each F-number, on the basis of the captured image data, the second signal value calculated for the arbitrary value, fixed pattern noise of each of the infrared detection pixels and the second ratio, and selects a minimum value among the F-numbers at which the sum of the second and third signal values calculated for a designated infrared detection pixel and the fixed pattern noise of the designated infrared detection pixel is less than a threshold value.

In the disclosed infrared imaging device, the arbitrary value is equal to or greater than the reference F-number.

In the disclosed infrared imaging device, the diaphragm control unit controls the diaphragm in a case in which a variation in the highest temperature of the object based on the captured image data obtained by capturing an image using the imaging element is greater than a threshold value.

A disclosed diaphragm control method is performed by an infrared imaging device including an imaging element including a plurality of infrared detection pixels which are two-dimensionally arranged, a diaphragm that is provided closer to an object than the imaging element, a temperature detection unit that detects a temperature of the diaphragm, and a storage unit that stores a first signal value corresponding to infrared rays, which are radiated from the diaphragm and are incident on each of the infrared detection pixels of the imaging element, so as to be associated with an F-number and the temperature of the diaphragm. The diaphragm control method comprises a diaphragm control step of selecting one of settable F-numbers, on the basis of the first signal value, captured image data obtained by capturing an image of the object using the imaging element in a state in which the F-number of the diaphragm is set to an arbitrary value, the temperature of the diaphragm detected by the temperature detection unit and the arbitrary value, and controlling the diaphragm so as to be set to the selected F-number.

In the disclosed diaphragm control method, the storage unit stores the first signal value so as to be associated with a reference F-number and a reference temperature of the diaphragm. In the diaphragm control step, a second signal value corresponding to the infrared rays, which are radiated from the diaphragm and are incident on each of the infrared detection pixels, is calculated for each F-number, on the basis of a first ratio of the temperature of the diaphragm detected by the temperature detection unit to the reference temperature, a second ratio of the settable F-number to the reference F-number and the first signal value, a third signal value corresponding to infrared rays, which are radiated from the object and are incident on each of the infrared detection pixels, is calculated for each F-number, on the basis of the captured image data, the second signal value calculated for the arbitrary value, fixed pattern noise of each of the infrared detection pixels and the second ratio, and a minimum value among the F-numbers at which the sum of the second and third signal values calculated for each of the infrared detection pixels and the fixed pattern noise of each of the infrared detection pixels is less than a threshold value is selected.

In the disclosed diaphragm control method, the storage unit stores the first signal value so as to be associated with a reference F-number and a reference temperature of the diaphragm. In the diaphragm control step, a second signal value corresponding to the infrared rays, which are radiated from the diaphragm and are incident on each of the infrared detection pixels, is calculated for each F-number, on the basis of a first ratio of the temperature of the diaphragm detected by the temperature detection unit to the reference temperature, a second ratio of the settable F-number to the reference F-number and the first signal value, a third signal value corresponding to infrared rays, which are radiated from the object and are incident on each of the infrared detection pixels, is calculated for each F-number, on the basis of the captured image data, the second signal value calculated for the arbitrary value, fixed pattern noise of each of the infrared detection pixels and the second ratio, and a minimum value among the F-numbers at which the sum of the second and third signal values calculated for a designated infrared detection pixel and the fixed pattern noise of the designated infrared detection pixel is less than a threshold value is selected.

In the disclosed diaphragm control method, the arbitrary value is equal to or greater than the reference F-number.

In the disclosed diaphragm control method, the diaphragm control step is performed in a case in which a variation in the highest temperature of the object based on the captured image data obtained by capturing an image using the imaging element is greater than a threshold value.

A disclosed diaphragm control program causes an infrared imaging device including an imaging element including a plurality of infrared detection pixels which are two-dimensionally arranged, a diaphragm that is provided closer to an object than the imaging element, a temperature detection unit that detects a temperature of the diaphragm, and a storage unit that stores a first signal value corresponding to infrared rays, which are radiated from the diaphragm and are incident on each of the infrared detection pixels of the imaging element, so as to be associated with an F-number and the temperature of the diaphragm to perform a diaphragm control step of selecting one of settable F-numbers, on the basis of the first signal value, captured image data obtained by capturing an image of the object using the imaging element in a state in which the F-number of the diaphragm is set to an arbitrary value, the temperature of the diaphragm detected by the temperature detection unit and the arbitrary value, and controlling the diaphragm so as to be set to the selected F-number.

INDUSTRIAL APPLICABILITY

The invention is particularly applied to, for example, in-vehicle cameras and is convenient and effective.

The invention has been described in detail above with reference to a specific embodiment. However, it will be understood by those skilled in the art that various modifications and changes of the invention can be made without departing from the scope and spirit of the invention.

This application is based on JP2014-200075 filed Sep. 30, 2014, the content of which is incorporated herein by reference.

EXPLANATION OF REFERENCES

2: diaphragm
3: imaging element
4: temperature detection unit
11: system control unit (diaphragm control unit)
16: main memory (storage unit)

What is claimed is:

1. An infrared imaging device comprising:
an imaging element comprising a plurality of infrared detection pixels which are two-dimensionally arranged;
a diaphragm that is provided closer to an object than the imaging element;
a temperature sensor by which a temperature of the diaphragm is detected;
a memory that stores a first signal value corresponding to infrared rays, which are radiated from the diaphragm and are incident on each of the infrared detection pixels of the imaging element, so as to be associated with an F-number and the temperature of the diaphragm; and
at least one hardware processor configured to: select one of settable F-numbers, based on the first signal value, captured image data obtained by capturing an image of the object using the imaging element in a state in which the F-number of the diaphragm is set to an arbitrary value, the temperature of the diaphragm detected by the temperature sensor and the arbitrary value; and control the diaphragm so as to be set to the selected F-number.

2. The infrared imaging device according to claim 1, wherein the memory stores the first signal value so as to be associated with a reference F-number and a reference temperature of the diaphragm, and
the diaphragm control unit calculates a second signal value corresponding to the infrared rays, which are radiated from the diaphragm and are incident on each of the infrared detection pixels, for each F-number, based on a first ratio of the temperature of the diaphragm detected by the temperature sensor to the reference temperature, a second ratio of the settable F-number to the reference F-number and the first signal value, calculates a third signal value corresponding to infrared rays, which are radiated from the object and are incident on each of the infrared detection pixels, for each F-number, based on the captured image data, the second signal value calculated for the arbitrary value, fixed pattern noise of each of the infrared detection pixels and the second ratio, and selects a minimum value among the F-numbers at which a sum of the second and third signal values calculated for each of the infrared detection pixels and the fixed pattern noise of each of the infrared detection pixels is less than a threshold value.

3. The infrared imaging device according to claim 1, wherein the memory stores the first signal value so as to be associated with a reference F-number and a reference temperature of the diaphragm, and the diaphragm control unit calculates a second signal value corresponding to the infrared rays, which are radiated from the diaphragm and are incident on each of the infrared detection pixels, for each F-number, based on a first ratio of the temperature of the diaphragm detected by the temperature sensor to the reference temperature, a second ratio of the settable F-number to the reference F-number and the first signal value, calculates a third signal value corresponding to infrared rays, which are radiated from the object and are incident on each of the infrared detection pixels, for each F-number, based on the captured image data, the second signal value calculated for the arbitrary value, fixed pattern noise of each of the infrared detection pixels and the second ratio, and selects a minimum value among the F-numbers at which a sum of the second and third signal values calculated for a designated infrared detection pixel and the fixed pattern noise of the designated infrared detection pixel is less than a threshold value.

4. The infrared imaging device according to claim 2, wherein the arbitrary value is equal to or greater than the reference F-number.

5. The infrared imaging device according to claim 3, wherein the arbitrary value is equal to or greater than the reference F-number.

6. The infrared imaging device according to claim 1, wherein the diaphragm control unit controls the diaphragm in a case in which a variation in highest temperature of the object based on the captured image data obtained by capturing an image using the imaging element is greater than a threshold value.

7. The infrared imaging device according to claim 2, wherein the diaphragm control unit controls the diaphragm in a case in which a variation in highest temperature of the object based on the captured image data obtained by capturing an image using the imaging element is greater than a threshold value.

8. The infrared imaging device according to claim 3, wherein the diaphragm control unit controls the diaphragm in a case in which a variation in highest temperature of the object based on the captured image data obtained by capturing an image using the imaging element is greater than a threshold value.

9. The infrared imaging device according to claim 4, wherein the diaphragm control unit controls the diaphragm in a case in which a variation in highest temperature of the object based on the captured image data obtained by capturing an image using the imaging element is greater than a threshold value.

10. The infrared imaging device according to claim 5, wherein the diaphragm control unit controls the diaphragm in a case in which a variation in highest temperature of the object based on the captured image data obtained by capturing an image using the imaging element is greater than a threshold value.

11. A diaphragm control method that is performed by an infrared imaging device comprising an imaging element including a plurality of infrared detection pixels which are two-dimensionally arranged, a diaphragm that is provided closer to an object than the imaging element, a temperature sensor by which a temperature of the diaphragm is detected, and a memory that stores a first signal value corresponding to infrared rays, which are radiated from the diaphragm and are incident on each of the infrared detection pixels of the imaging element, so as to be associated with an F-number and the temperature of the diaphragm, the method comprising:

a diaphragm control step of selecting one of settable F-numbers, based on the first signal value, captured image data obtained by capturing an image of the object using the imaging element in a state in which the F-number of the diaphragm is set to an arbitrary value, the temperature of the diaphragm detected by the temperature sensor and the arbitrary value, and controlling the diaphragm so as to be set to the selected F-number.

12. The diaphragm control method according to claim 11, wherein the memory stores the first signal value so as to be associated with a reference F-number and a reference temperature of the diaphragm, and in the diaphragm control step, a second signal value corresponding to the infrared rays, which are radiated from the diaphragm and are incident on each of the infrared detection pixels, is calculated for each F-number, based on a first ratio of the temperature of the diaphragm detected by the temperature sensor to the reference temperature, a second ratio of the settable F-number to the reference F-number and the first signal value, a third signal value corresponding to infrared rays, which are radiated from the object and are incident on each of the infrared detection pixels, is calculated for each F-number, based on the captured image data, the second signal value calculated for the arbitrary value, fixed pattern noise of each of the infrared detection pixel and the second ratio, and a minimum value among the F-numbers at which a sum of the second and third signal values calculated for each of the infrared detection pixels and the fixed pattern noise of each of the infrared detection pixels is less than a threshold value is selected.

13. The diaphragm control method according to claim 11, wherein the memory stores the first signal value so as to be associated with a reference F-number and a reference temperature of the diaphragm, and in the diaphragm control step, a second signal value corresponding to the infrared rays, which are radiated from the diaphragm and are incident on each of the infrared detection pixels, is calculated for each F-number, based on a first ratio of the temperature of the diaphragm detected by the temperature sensor to the reference temperature, a second ratio of the settable F-number to the reference F-number and the first signal value, a third signal value corresponding to infrared rays, which are radiated from the object and are incident on each of the infrared detection pixels, is calculated for each F-number, based on the captured image data, the second signal value calculated for the arbitrary value, fixed pattern noise of each of the infrared detection pixels and the second ratio, and a minimum value among the F-numbers at which the sum of the second and third signal values calculated for a designated infrared detection pixel and the fixed pattern noise of the designated infrared detection pixel is less than a threshold value is selected.

14. The diaphragm control method according to claim 12, wherein the arbitrary value is equal to or greater than the reference F-number.

15. The diaphragm control method according to claim 13, wherein the arbitrary value is equal to or greater than the reference F-number.

16. The diaphragm control method according to claim 11, wherein the diaphragm control step is performed in a case in which a variation in the highest temperature of the object based on the captured image data obtained by capturing an image using the imaging element is greater than a threshold value.

17. The diaphragm control method according to claim 12, wherein the diaphragm control step is performed in a case in which a variation in the highest temperature of the object based on the captured image data obtained by capturing an image using the imaging element is greater than a threshold value.

18. The diaphragm control method according to claim 13, wherein the diaphragm control step is performed in a case in which a variation in the highest temperature of the object based on the captured image data obtained by capturing an image using the imaging element is greater than a threshold value.

19. The diaphragm control method according to claim 14, wherein the diaphragm control step is performed in a case in which a variation in the highest temperature of the object based on the captured image data obtained by capturing an image using the imaging element is greater than a threshold value.

20. The diaphragm control method according to claim 15, wherein the diaphragm control step is performed in a case in which a variation in the highest temperature of the object based on the captured image data obtained by capturing an image using the imaging element is greater than a threshold value.

21. A non-transitory computer readable medium storing a diaphragm control program that causes an infrared imaging device including an imaging element including a plurality of infrared detection pixels which are two-dimensionally arranged, a diaphragm that is provided closer to an object than the imaging element, a temperature sensor by which a temperature of the diaphragm is detected, and a memory that stores a first signal value corresponding to infrared rays, which are radiated from the diaphragm and are incident on each of the infrared detection pixels of the imaging element, so as to be associated with an F-number and the temperature of the diaphragm to perform:

a diaphragm control step of selecting one of settable F-numbers, based on the first signal value, captured image data obtained by capturing an image of the object using the imaging element in a state in which the F-number of the diaphragm is set to an arbitrary value, the temperature of the diaphragm detected by the temperature sensor and the arbitrary value, and controlling the diaphragm so as to be set to the selected F-number.

* * * * *